United States Patent [19]

Eshbaugh

[11] 4,025,072

[45] May 24, 1977

[54] SPORT RACKET FRAME AND APPARATUS FOR PRODUCING SAME

[76] Inventor: Robert W. Eshbaugh, 533 Davisville Road, Willow Grove, Pa. 19090

[22] Filed: Dec. 30, 1974

[21] Appl. No.: 537,375

Related U.S. Application Data

[63] Continuation of Ser. No. 341,525, March 15, 1973, abandoned, which is a continuation of Ser. No. 868,780, Oct. 23, 1969, abandoned.

[52] U.S. Cl. .............................................. 273/73 F
[51] Int. Cl.² ......................................... A63B 49/10
[58] Field of Search ............ 273/67 R, 73 R, 73 C, 273/73 F, 73 K, 80 R, 80 B, DIG. 7, DIG. 23

[56] References Cited

UNITED STATES PATENTS

| 1,035,105 | 8/1912 | Slazenger | 273/73 F |
|---|---|---|---|
| 1,054,059 | 2/1913 | Tunmer | 273/73 F |
| 1,921,616 | 8/1933 | Hall | 273/73 F X |
| 2,377,335 | 6/1945 | Finlayson et al. | 273/DIG. 7 |
| 2,594,693 | 4/1952 | Smith | 273/DIG. 7 |
| 2,749,266 | 6/1956 | Eldred | 273/73 F X |
| 2,837,456 | 6/1958 | Parilla | 273/DIG. 7 |
| 2,878,020 | 3/1959 | Robinson | 273/73 F |
| 2,966,903 | 1/1961 | Veneko | 273/DIG. 7 |
| 2,980,158 | 4/1961 | Meyer | 273/73 F X |
| 3,166,319 | 1/1965 | Brilhart | 273/80 R |
| 3,313,541 | 4/1967 | Benkoczy et al. | 273/DIG. 7 |
| 3,457,962 | 7/1969 | Shobert | 273/DIG. 7 |
| 3,491,055 | 1/1970 | Talley | 273/73 F X |

FOREIGN PATENTS OR APPLICATIONS

| 17,462 | 5/1934 | Australia | 273/73 F |
|---|---|---|---|
| 541,837 | 10/1955 | Belgium | 273/73 F |
| 1,512,401 | 1/1968 | France | 273/73 F |
| 585,489 | 2/1947 | United Kingdom | 273/DIG. 7 |
| 1,122,895 | 8/1968 | United Kingdom | 273/73 F |

*Primary Examiner*—Richard J. Apley
*Attorney, Agent, or Firm*—Stevens, Davis, Miller & Mosher

[57] ABSTRACT

The invention relates to a new construction for a laminated sport racket frame, such as for a tennis racket. The frame head is made up of a closed loop while at least another layer of material is wound along the outer periphery of the loop and extends away therefrom at the neck portion of the frame to form the handle portion. The foregoing is achieved through the use of windable materials for forming the respective layers of the laminate, these materials being rigidified by a hardenable liquid bonding agent. The use of windable materials results in a relatively high volumetric ratio of windable material to bonding agent in the finished laminate.

13 Claims, 16 Drawing Figures

INVENTOR
ROBERT ESHBAUGH

BY Stevens, Davis, Miller & Mosher
ATTORNEYS

INVENTOR
ROBERT ESHBAUGH

BY Stevens, Davis, Miller & Mosher
ATTORNEYS

FIG. 16

SPORT RACKET FRAME AND APPARATUS FOR PRODUCING SAME

This is a continuation, of application Ser. No. 341,525, filed Mar. 15, 1973 now abandoned, which in turn is a continuation application of Ser. No. 868,780 filed Oct. 23, 1969, now abandoned.

This invention relates to an improved racket frame and to a method and apparatus for producing same.

It has been the customer, when providing a means to propel a ball in the games of tennis, badminton, squash, and so forth, to utilize a racket frame of wood, the head of which is provided with a nylon or "gut" string which contacts the ball to propel it. However, these wooden rackets suffer from many disadvantages, which include relatively low tensile and compressive strengths, susceptability to warpage, scuffing, and the like. Furthermore, these wooden rackets tend to lose their color and, therefore, attractiveness, over a period of years along with their flexible properties, resulting in a relatively short fatigue life. In addition, these wooden frames must be of a certain relatively large cross section to provide the necessary strength, resulting in a relatively high wind resistance. Also in wooden frames, it is extremely difficult to manufacture a uniform product in regard to weight, balance, density and other mechanical properties since wood is a heterogeneous material, varying in density, moisture content, and modulus of elasticity.

A notable disadvantage of wood resides in the fact that it is relatively inflexible and can be shaped only with great difficulty relative to pliant, filamentary materials which are windable. Another disadvantage of wood resides in the fact that it possesses considerable strength along only one direction and relatively little strength transversely to that one direction, this resulting normally in wooden rackets which are strong in tension but weak in shear. This applies also to racket frames built up from a plurality of layers of wood since the grain in the respective wood layers will normally run in a common direction.

Only recently attempts have been made to provide a racket frame of fiberglass material which, in general, has a higher strength and a greater freedom from warpage, etc., than wood. However, these frames have also suffered in several respects, including a relatively high cost and lack of product uniformity, these being due to the fact that there has not yet been proposed any type of apparatus and method for uniformly manufacturing such rackets through a relatively efficient utilization of materials in order that the cost of each individual racket can be at a competitive level with that of wooden rackets.

It is, therefore, an object of this invention to provide a fiberglass or like material racket frame which exhibits a greater strength than the wooden racket frames; a greater fatigue life; a more advantageous control of degree of flexibility and stiffness; a greater resistance to damage, color and fading; a greater resistance to warpage, mositure, flame and chemicals.

It is a further object of this invention to provide an apparatus and a rapid, simple fabrication technique which permits a more efficient utilization of materials, thus resulting in a racket frame which is more economical and easier to produce.

In summary, the objects of the present invention are realized through the use of flexible, windable materials for forming the racket frame, a plurality of layers of such materials being bonded to each other to form a rigid laminate by means of a hardenable bonding agent.

The fact that the load-bearing material of the racket is a flexible, windable material greatly facilitates the conforming of said material into any desired configuration relative to normally rigid, non-pliant materials such as wood. Because of this feature, it is very simple to form a closed loop of such material to constitute part of the curvilinear head of the racket frame, such a closed loop providing increased strength in the head to resist the tension in the racket head stringing. Known wooden frames, on the other hand, are made up of wood layers which at the top end of the frame handle separate from each other to define the arcuately shaped head and this point of separation, referred to as the throat of the frame, constitutes a weak spot in the head structure relative to the forces imposed thereon by the tensioned stringing.

Further, such windable materials are produceable in any desired lengths thereby lending themselves to a wide variety of possible racket manufacturing techinques. For example, according to one embodiment of the present invention, a continuous length of windable material in band form is successively wound along respective helical paths of different angularity to form overlying laminate layers each providing strength in respective directions transverse to each other. This technique results in a stock piece having a thickness equal to that of many individual racket frames so that this single stock piece can then be sliced to form a plurality of said frames.

According to another embodiment of the invention, an apparatus is provided for producing individual frames, one at a time, always employing the same windable materials as used in the first mentioned embodiment.

Fiberglass is an example of what is included within the category of flexible, windable materials for use within the context of this invention. The term windable refers to materials which can be easily made by tension to follow any desired shape, as for example, materials which can be wound around a surface of revolution to form a roll. Fiberglass is such a windable material and, as is well know, it is particularly suitable to provide strength in a wide variety of molded structures.

In order, however, to bond the respective material layers to each other and to achieve a rigid, integral structure, the present invention requires the use of a hardenable bonding agent, such as any of a variety of known resins, such as epoxies, polyesters, etc., or even animal glues. The bonding agent may, for example, be a heat hardenable (thermosetting) resin or one which is not necessarily heat hardenable but hardenable through other means. A curing agent may be used together with the bonding agent to accelerate the hardening thereof.

Since the aforementioned bonding agent only serves to bond the respective load-bearing material layers to each other to transmit mostly shear stresses between the glass fibers, it is desirable to minimize the proportion of bonding agent relative to the proportion of load-bearing material in the finished racket frame. Known molded glass material laminates in general have a density of from 0.045 to 0.065 lbs./in$^3$ of the finished product and some laminate structures have as low a density as 0.010 lbs./in$^3$. On the other hand, the winding and tensioning technique of the present invention, results in a squeezing out of surplus bonding agent from between the glass fibers so that laminates according to this invention have a density of from 0.065 to 0.085 lbs/in³ of frame structure. It is seen, therefore, that such frames are notably stronger than heretofore known molded laminate structures.

The aforementioned laminate density is of course, proportional to the volume ratio of glass material to bonding agent remaining in the finished product. In other words, the stated laminate density range of 0.065 to 0.085 lbs/in³ actually can be translated into volumetric terms since specific gravity and the density of glass fibers per se is well known as is also the density and S.G. of the aforementioned resin bonding agents. The specific gravity of such materials is disclosed in "Handbook of Reinforced Plastics of the SPI", Oleesky and Mohr. Van Nostrand Reinhold Co.

| Ref. 1 | Chapter III-I pg. 121 |
| Ref. 2 | Table II 3.1 |
| Ref. 3 | Table II 1.4 | as follows:

| Resin, Epoxy | sp. gr. 1.15 – 1.20 | Ref. 1 |
| Resin, Polyester | sp. gr. 1.05 – 1.14 | Ref. 2 |
| Glass, E type Roving | sp. gr. 2.54 | Ref. 3 |

From the foregoing, one can easily calculate the respective volume ratios (volume fraction) of glass to resin which correspond to the aforementioned glass-epoxy laminate density range of 0.065 to 0.085 lbs/in³. Using, for example, the highest density resin (sp. gravity of 1.20), it is found that the volume fraction of glass to resin corresponding to the laminate density 0.065 lbs/in³ is 0.45 while if the lowest density resin used (having a sp. gravity of 1.05) and calculating at the highest laminate density of 0.085 lbs/in³ of the finished product, the volume fraction of glass to resin is 0.87.

In fact, the volume fraction of windable material to resing is more broadly representative of the nature of the invention than is the aforementioned laminate density of 0.065 to 0.085 lbs/in³ since said density applies only to laminate made up of glass fibers and resin while the volume fraction applies to any and all other windable materials, including glass. The maximum volume ratio realizable according to known sports racket laminating techniques is substantially 0.58. According to the present invention, the volume fraction may go as high as 0.87.

In fact, the aforementioned density range is easily converted into volumetric terms as follows:

$SG_L$ = specific gravity of composite laminate
$SG_R$ = specific gravity of resin binder
$SG_G$ = specific gravity of glass reinforcement
$VF_G$ = volume fraction of glass reinforcement
$VF_R$ = volume fraction of resin reinforcement
$VF_G + VF_R = 1$  $VF_R = 1 - VF_G$
$SG_L = VF_G \cdot SG_G + VF_R \cdot SG_R$
$SG_L = VF_G \cdot SG_G + (1 = VF_G) SG_R$
$SG_L = VF_G (SG_G - SG_R) + SG_R$ $$VF_G = \frac{SG_L - SG_R}{SG_G - SG_R} \text{ (Formula I)}$$

$$\text{Specific Gravity} = \frac{\text{density}}{\text{density of water}} = 27.7 \times \text{density}$$

Density of
0.065No./in³ = SG of 1.80
0.085No./in³ = SG of 2.35

The calculation of the volume fraction range represented by the density range 0.065 – 0.085 is as follows:
Laminate density range of 0.065No./in³ – 0.085No./in³ = specific gravity range of 1.80 – 2.35

The specific gravity of the materials used are as follows:
Resin, Epoxy, sp. gr. 1.15 – 1.20
Resin, Polyester, sp. gr. 1.05 – 1.14
Glass, E type Roving, sp. gr. 2.54

Substituting these values into Formula I gives a glass volume fraction range of 0.45 to 0.87.

Reference is now made to the accompanying drawings for a better understanding of the nature and objects of the present invention, which drawings illustrate the best mode presently contemplated for carrying out the objects of the invention and its principles and are not to be construed as restriction or limitations on its scope.

Referring now to the drawings in general and specifically to FIGS. 1–4 thereof, there is shown, in general a mold 10 which is formed of various component parts, including a back plate 12, an elliptical shaped mandrel 16 and a front plate 14. Also provided are a pair of clamping members 18 and 20 and a center piece 22 which does not form a portion of the mold, but rather is included in the final cured racket frame. After the materials to be cured are placed in the mold in a manner to be discussed in detail later, the mold is closed, the means for effecting this being seen in FIG. 4. As shown, back plate 12 and front plate 14 each have a plurality of holes 24 through which is inserted bolts 26. Mandrel 16, which is inserted between the plates, also is provided with holes 24 through which the bolts 26 extend. Nuts 28 are then tightened over the bolts 26 in order to lock the parts together.

Figure 1:
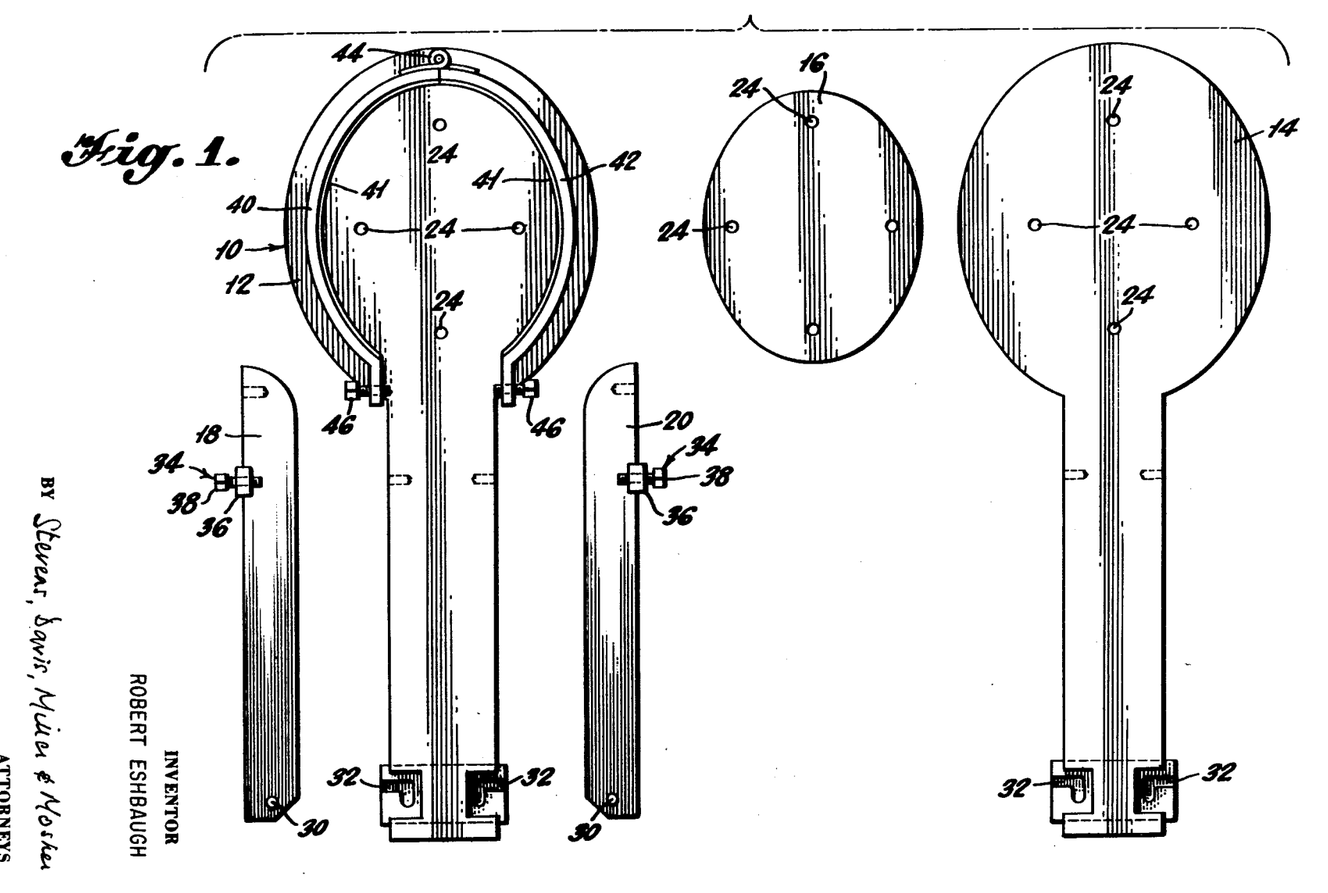
FIG. 1 is a plan view of the major components for forming a single racket frame according to the subject invention.
Figure 3:
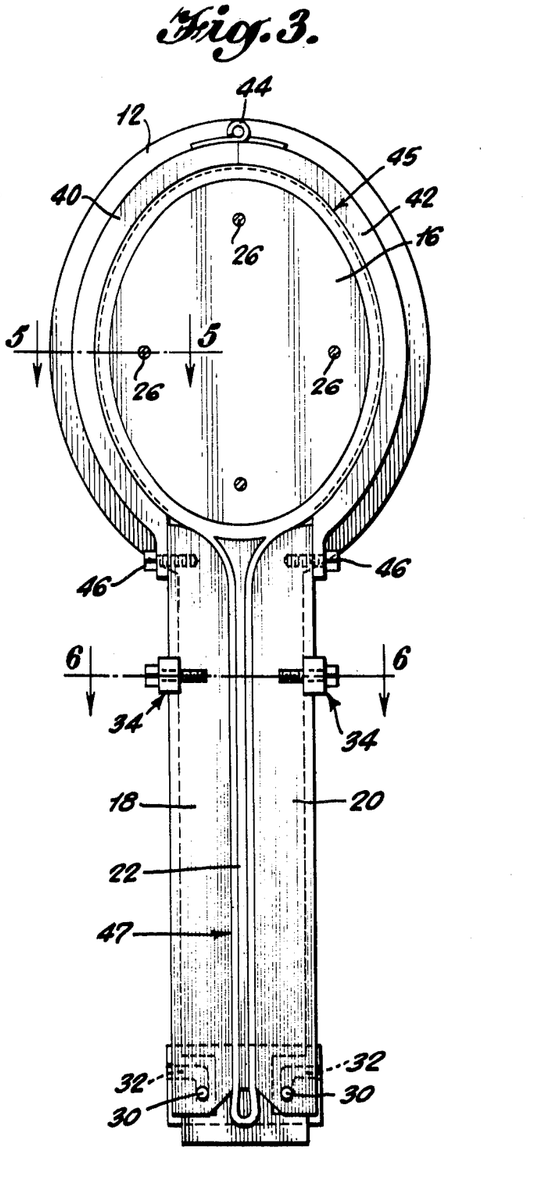
FIG. 3 is a plan view with the mold assembled, but with the front plate omitted for the sake of clarity.
Figures 4, 5, 6, 7:
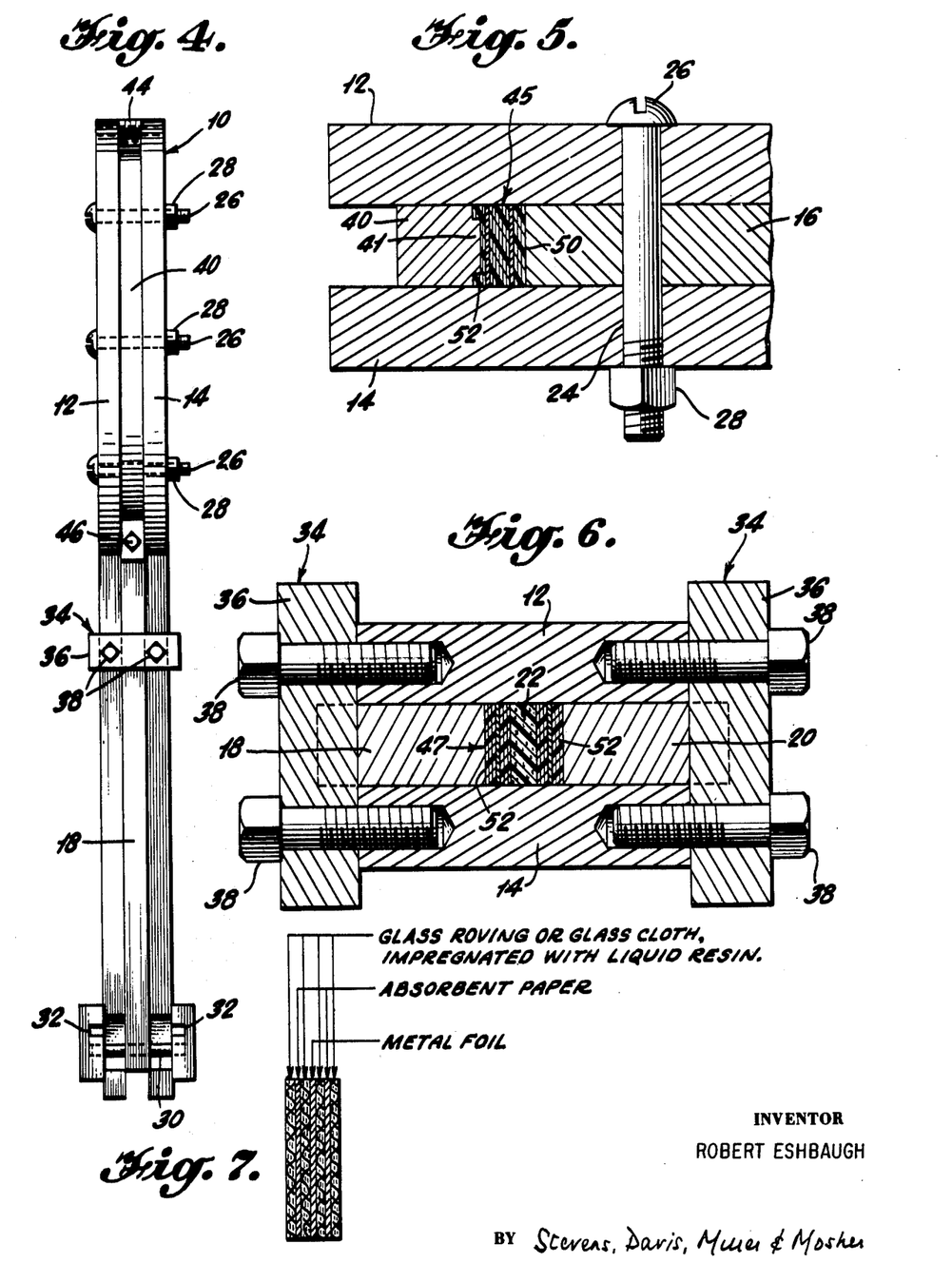
FIG. 4 is a side elevation of the assembled mold.
FIG. 5 and FIG. 6 are sectional views taken along lines 5—5 and 6—6 respectively of FIG. 3.
FIG. 7 is a sectional view of a typical ply of the racket frame taken along line 7—7 of FIG. 2.

Clamping members 18 and 20 are provided to form the frame handle and are seen in a disassembled condition in FIG. 1 and, as shown in FIG. 3, are secured to the side plates 12 and 14 by means of a pair of pins 30 extending outwardly from the lower portion of each of said clamping members. Each pin engages in a corresponding L-shaped slot 32 formed on each side of back plate 12 and front plate 14, the L-shaped slot being provided to lock the clamping members in this operative position as seen in FIG. 3. To secure the upper portion of each clamping member to the side plates, there is provided a securing means shown generally at 34 in FIGS. 1, 3 and 4 and more particularly in FIG. 6. As seen in FIG. 6, these clamp securing means 34 comprise a plate 36 extending through a portion of each clamping member and abutting the side edges of each of said front and back plates 12 and 14 respectively. Plates 36 are secured to the mold by means of bolts 38 which extend through the plates 36 and are threaded into the back and front plates 12 and 14 as shown in FIG. 6.

Figure 2:
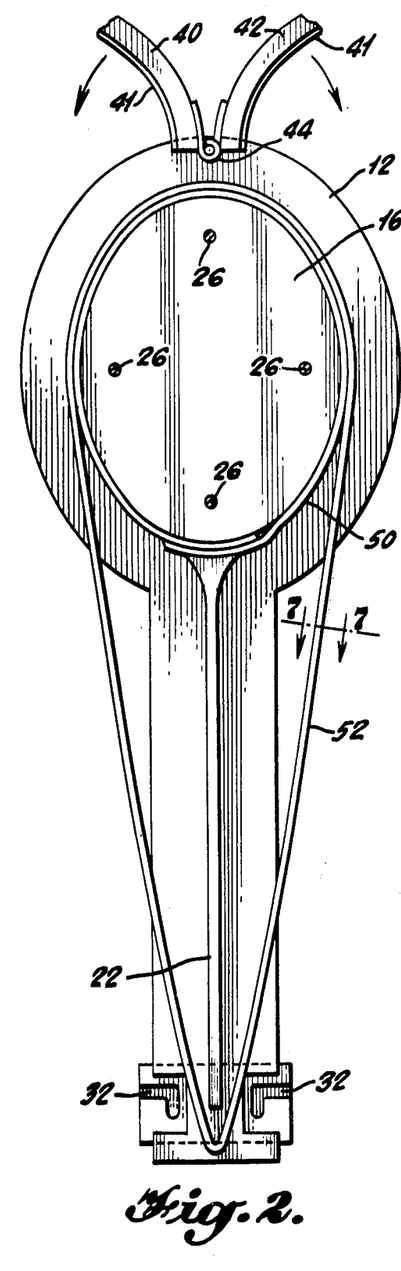
FIG. 2 is a plan view illustrating the preliminary step in the assembling of the mold and the forming of the racket frame.

In order to provide a groove extending along the outer surface of the finished frame head 45 to aid in the eventual stringing of the head, there may be provided, on the mold, a pair of arcuate shaped arms 40 and 42 which may be pivotally connected to plates 12 and 14 as seen in FIG. 2 by means of a hinge 44. In their operative position these arcuate arms extend substantially around the head portion 45 of the racket frame and are secured to the clamping members 18 and 20 respectively by means of a bolt clamp shown generally at 46 in FIG. 3. Each of the bolt clamps extending through the respective arcuate arms are threaded into a hole formed in the clamping members 18 and 20. As better seen in FIG. 5, a flange 41 is provided on this arm 40 which engages the material to be cured as shown in said figure, to form a groove in the outer surface of the cured frame. It is to be understood that a similar flange is provided on arm 42.

Finally a center piece 22 is provided which is of a plastic, plastic foam, light wood or light metal and which serves as a spacer and filler in that it retains the limp uncured composite rings in proper position in the mold and provides a means against which clamping members 18 and 20 may act.

The material used in forming the racket frame of the present invention is better seen in FIG. 2 which shows the mold in a partially assembled state. This material includes an inner loop or ring 50 extending around the mandrel 16 which may have its ends cut and overlapped near the bottom end of the mandrel as shown; and an outer loop or ring 52 which is of a considerably longer extent than the inner loop so that when the outer loop is placed over the inner loop as shown, the lower portion of the outer loop will extend downwardly through the entire length of the mold to form the handle portion 47 of the racket frame. The loops may be directly wound onto the mandrel or manually placed thereon after being formed on a separate mandrel.

FIGS. 5, 6 and 7 all illustrate the laminated structure of the frame in cross section and FIG. 7 identifies each component layer thereof, it being understood that it is within the scope of the invention to vary the order of the components as well as the numbers of layers of each as desired. Since FIG. 5 is taken along a portion of the frame head 45, the structure of the inner loop 50 and the outer loop 52 will be molded together while, since FIG. 6 depicts a cross section of the frame handle 47, only the outer loop 52 is shown between the sides of which a center piece extends. Each individual layer of material subtends the width of the racket and that each of the handle layers extends from the bottom portion of the frame handle upward around the frame head and then downward back towards the handle.

As is seen in FIG. 7, the frame structure is a laminate formed of a plurality of layers of different materials including layers of glass cloth or glass roving impregnated with a hardenable liquid bonding agent, layers of absorbent material such as stands, tapes, or sheets of cellulose, asbestos or plastic foam, and at least one layer of metal foil. The layers of glass material provide strength and are the load bearing layers of the frame structure while the absorbent paper layers serve to space the glass material layers away from the neutral axis of the frame so that the frame will be strong in bending. The paper layers also serve to absorb and evenly distribute the bonding agent which is applied to the glass layers in liquid form. The metal foil layer or layers provide stiffness and added strength to the frame structure and are usually of a density of 0.1 lbs/in$^3$. If such stiffness and added strength are not needed, the metal foil may be replaced by plastic or paper tape since the foil layer also is intended to serve as a barrier between respective groups of layers of the other materials.

It should be understood that FIGS. 5, 6, and 7 are merely broadly illustrative of a possible sequential arrangement of the respective layers. In actual practice, a frame according to this invention will comprise a total of about a sixty layers of the three types of material, of which the glass layers will each be about 0.007 inches thick and the metal foil layers will each be slightly thicker than 0.010 inches. Further, it should be understood that there need not be one layer of paper for each two layers of glass material, as illustrated in FIG. 7. Instead, for example, there may be one paper layer for each four, six, eight, etc., layers of glass material and the same principle applies to the metal foil layers.

Glass cloth instead of glass rovings is desirable in the outer layers of the racket frame to realize increased shear strength in the transverse direction of the frame.

The inner loop and outer loop may each be separately formed by applying a thermosetting adhesive to a plurality of fiberglass rovings and winding the rovings onto the mandrel 16 or onto a separate mandrel along with absorbent paper and foil, the weight of the frame being, of course, determined by the number of layers of each material. If a separate mandrel is used, the loops are removed therefrom before hardening of the bonding agent occurs and they are then placed on the mandrel 16 as discussed above.

In the steps of forming the racket frame according to the present invention, the mandrel 16 may be initially coated with a release agent and an uncured or "B-staged" loop comprising layers of the above mentioned materials is placed around the mandrel. The free ends of this loop may then be cut and overlapped adjacent the lower portion of the mandrel as seen in FIG. 2 in order to provide additional thickness for the throat portion of the frame, or the loop may be left freely hanging on the mandrel. Then the outer loop 52 is placed over the inner loop 50 on the mandrel 60, this outer loop being of the same materials as the inner loop. Side plates 12 and 14, which may be also coated with a release agent, are then secured adjacent each face of the mandrel by means of bolts 26 as discussed above and the side plates are then tightened to the desired degree and locked by tensioning nut 28 on the bolts. The outer loop is then stretched downwardly by means not shown so that the lower portion thereof extends at least to the lower end of the mold which removes wrinkles, air or resin pockets from the material layers and minimizes slippage therebetween. An elongated spacer 22 may then be inserted within the lower portion of this outer loop and adjacent the lower portion of the mandrel as seen in FIG. 2.

The lower portion of the stretched outer loops 52 is then clamped inward by the clamping members 18 and 20 so that it will abut the center piece, thus densifying the laminate by squeezing out the excess resin while forming the frame handle. It should be understood that the stretching means discussed above must "give" slightly in a direction towards the mandrel against the action of the clamping members while still maintaining the requisite degree of tension. Arms 40 and 42 which are hinged between side plates, may then be pivoted downwardly and clamped by means of bolts 46 to the upper portion of the clamping members 18 and 20, the flange 41 on each arm extending into the outer surface of the outer loop in order to form a groove therein which is utilized to protect the racket strings from scuffing.

The bonding agent is then cured by any known method, such as by use of an electrical heating element or steam pipes attached directly to the mold plates or by simply placing the mold inside an over. The time, temperature and conditions necessary to polymerize the bonding agent depend on its chemical nature, it being understood that production and economy considerations dictate the choice of a fast curing system with a heat cure. For example, it has been found that a typical initial curing time for a thermosetting adhesive such as epoxy resin blended with an amine curing agent is one hour at 200° F.

The rigidified racket frame is then removed from the mold by simply disassembling the mold in reverse order as discussed earlier and knocking out the mandrel from within the frame head. The frame then may be subjected to an additional heat cycle to insure conplete polymerization. For a typical system it could be post cured at 250°-275° F. for two hours. This may be performed either with the frame on or off the mold, the latter being more economical as it permits reuse of the mold earlier in the production cycle.

A series of final finishing steps are then performed on the rigidified racket frame which may consist of removing any flash present, cutting the shaft to the proper length, drilling the string holes, adding any necessary labels and decorative decals, buffing and polishing, forming any type of handle, and spraying a glossy sealer varnish or the like over the frame.

The string holes are drilled within the groove formed in the outer surface of the frame head, so that the string will not extend outward from the outer surface of the frame head, the string thus being less susceptible to being frayed in actual use.

Figures 8, 9, 10:
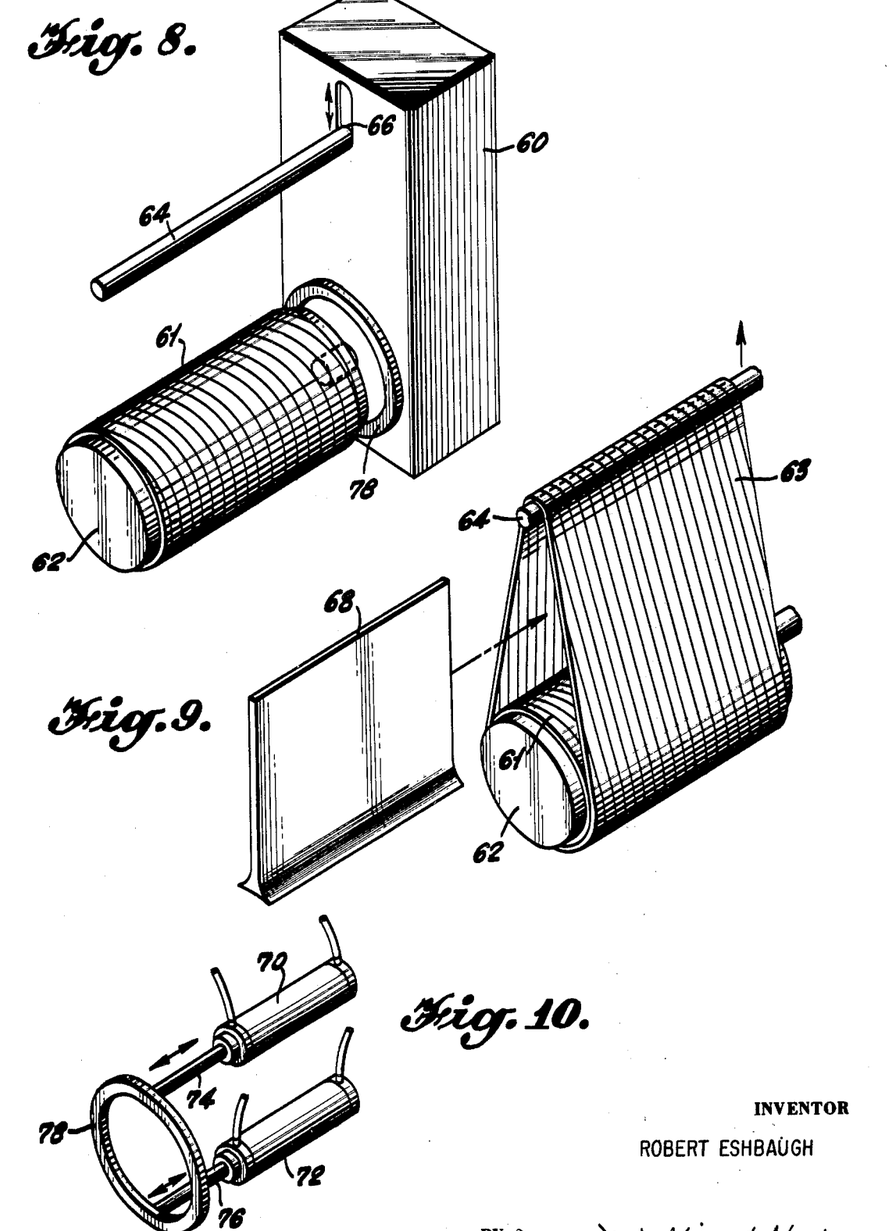
FIG. 8 is a perspective view of an apparatus used in the forming of a stock piece from which a plurality of rackets may be formed, showing the inner ring which forms a portion of the racket head wrapped about a lower mandrel.
FIG. 9 is a fragmentary perspective view of the device of FIG. 8 showing a further step in the assembly of a stock piece from which a plurality of frames may be formed.
FIG. 10 is a perspective view of a device for ejecting the finished stock piece from the apparatus of FIG. 8 and 9.

Referring now to FIGS. 8-13 relate to another embodiment of the present invention, an elongated stock piece is formed which has a cross section corresponding to the shape of the finished racket frame. This stock piece, of course, is considerably wider than the finished frame and after it has been molded it is sliced into a plurality of individual frames. The apparatus for forming the frame stock piece includes a base 60 in which is journaled a lower mandrel 62, means being provided in base 60 for rotating mandrel 62. As in the first embodiment the mandrel 62 may be shaped according to the frame head, such as elliptical. As seen in FIG. 8 tension rod 64, the longitudinal axis of which is parallel to that of mandrel 62, is mounted in base 60 at 66 in a manner so that it can move in a direction toward and away from the mandrel 62, for reasons that will be explained later, it being understood that any known means are provided in base member 60 for permitting this movement.

The stock piece is formed by first winding or placing an inner loop 61 of substantially fiberglass material directly around the mandrel 62. This inner loop may comprise overlying layers of glass rovings helically wound at respective different angels around the mandrel to provide a shear strength in all directions thereby eliminating the need for glass cloth or the like to accomplish this same purpose. The respective helical windings are indicated by the lines 93 and 95 in FIG. 13, it being understood that the absorbent paper and foil may also be wound similarly, or applied as a sheet extending the entire width of the mandrel.

Figures 11, 12, 13:
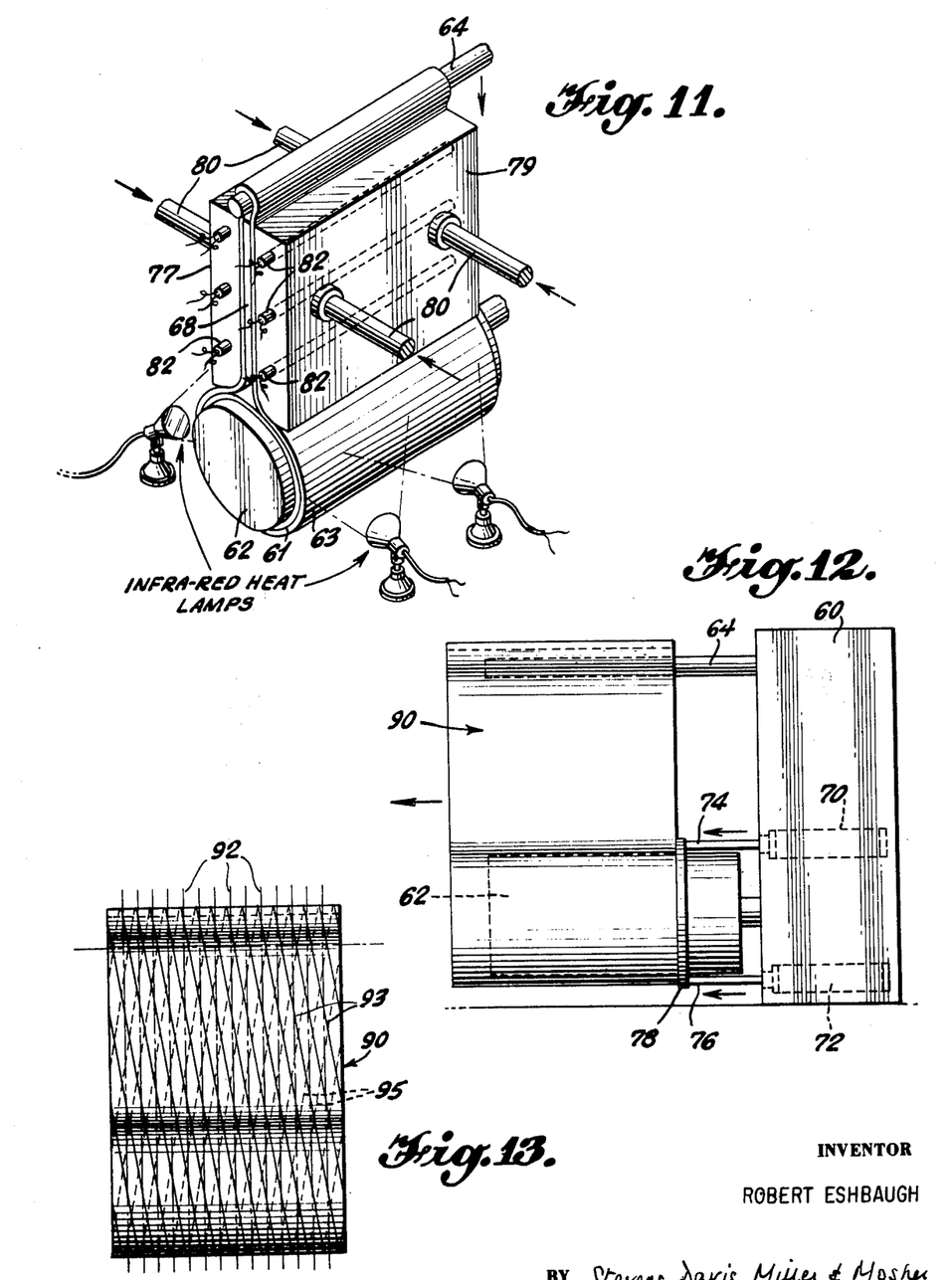
FIG. 11 is a perspective view showing the arrangement of FIGS. 8 and 9 during the step of curing the stock piece.
FIG. 12 is a side elevation of the stock piece being ejected from the machine.
FIG. 13 is a side elevation of a completed stock piece with phantom lines indicating lines through which the stock piece may be cut to form separate racket frames; and, FIGS. 14 and 15 respectively illustrate material supply rolls and resin coating means according to this invention.

After the inner loop has been wound around mandrel 62, an outer loop 63, is placed around the mandrel and the tension rod 64, the outer loop, of course, extending along a portion of the inner loop as shown in FIG. 9. As in the first embodiment, each loop may be directly wound around the mandrel and rod or formed on a separate mandrel and then manually placed over mandrel 62 and rod 64. The tension rod 64 is then moved parallely away from the mandrel in order to place a predetermined tension on the outer loop 63. After center piece 68 has been inserted within the outer loop 63 and adjacent mandrel 62, a pair of clamping members 77 and 79 are clamped adjacent each side of the outer loop 63 as shown in FIG. 11 to form the frame handle. Rams 80 or the like may be provided to exert an inward clamping force on members 77 and 79, as shown in FIG. 11, it being understood that rod 64 will have to give a little to accommodate this inwardly directed force. Infrared heat lamps, or the like, along with electrical heating elements 82, which extend through clamping members 77 and 79 may be utilized to effect the curing of the bonding agent in the stock piece layers.

It should be understood that means may also be provided to form a series of grooves which protect the strings, as discussed in relation to the first embodiment.

Means are also provided to eject the cured stock piece from the mandrel and tension rod after the clamping members 77 and 79 have been retracted, this means being shown in FIGS. 10 and 12. A pair of cylinders 70 and 72 are provided which are mounted in base member 60 and which have a pair of piston rods 74 and 76, respectively slidably mounted therein. Attached to the free end of the piston rods 74 and 76 is an elliptical yoke shown at 78 which, in the assembled condition shown in FIG. 12, extends around the mandrel 62. When the finished stock piece 90 has been sufficiently cured, it is ejected from the mandrel and tensioning rod by action of the pistons 74 and 76. The pistons may be actuated by means of a fluid or the like being forced into the cylinders 70 and 72 in any known manner.

The temperature and time conditions used in the curing of the bonding agent in the inner and outer loops may be the same as discussed earlier.

It is to be understood that the curing operation is normally performed while the inner and outer loops are still in the mold and that the cured stock piece also may be subjected to a post curing at temperatures which correspond to those in the first embodiment, said post curing occurring before or after the ejection of the stock piece from the mold. Then the stock piece is sliced along lines 92 in FIG. 12 to form a plurality of individual frames which, of course, then may be subjected to finishing operations as discussed in relation to the first mentioned embodiment.

Figure 14:
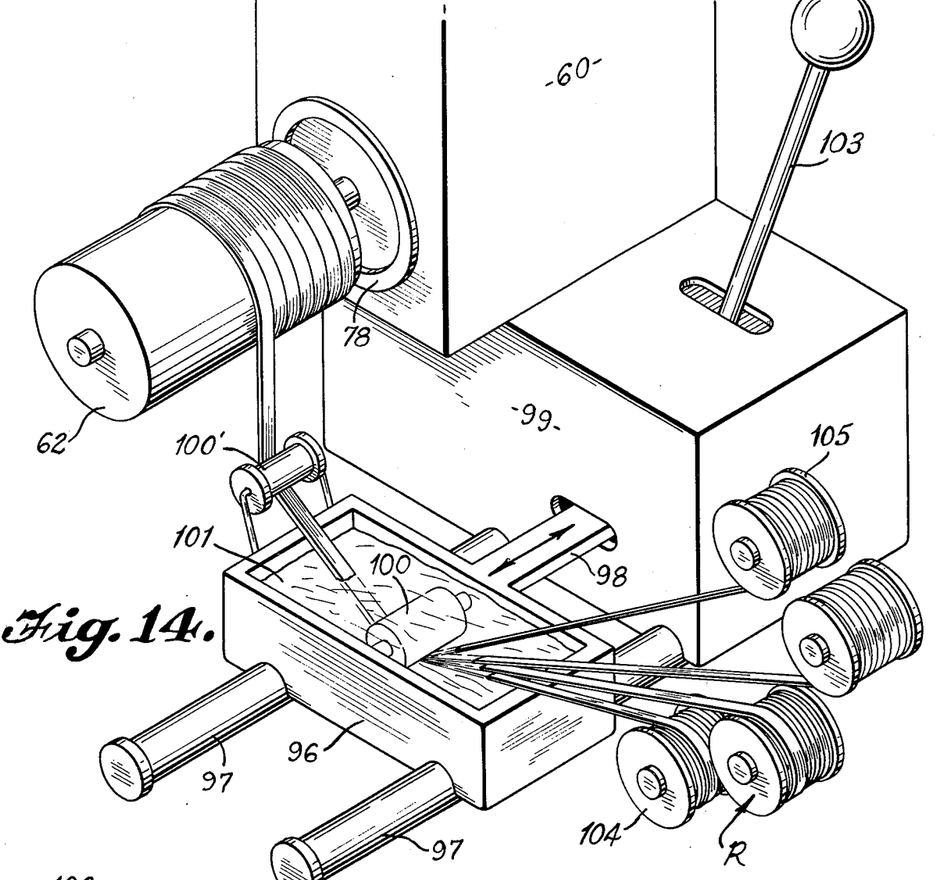

FIG. 14 illustrates an arrangement whereby the respective materials in the form of strips, bands or rovings may be helically wound along the axial extent of the mandrel 62 so as to form successive overlying layers of such materials. Referring to said figure, it is seen that a traversing carriage 96 is slidably supported along rails 97 for reciprocating movement parallel to the rotational axis of mandrel 62. A reciprocating drive member 98 is engaged with said carriage and is itself driven through suitable gearing forming part of a not shown transmission housed within transmission housing 99. The shown rotatably mounted supply rolls R located laterally of the carriage comprise rolls of glass roving, a roll of metal foil, and a roll of absorbent material, these materials being led from said rolls and past a guide means 100 and 100' mounted on the carriage and onto the mandrel 62. The carriage includes a trough 101 containing a liquid bonding agent for impregnating the materials as they pass the guide means 100.

The drive member 98 is driven by the not shown transmission within housing 99 in synchronism with the rotation of mandrel 62 so that carriage 96 is advanced linearly a certain extent for each revolution of said mandrel so as to provide a corresponding helix angle for the respective layers of materials which are wound onto the mandrel. In fact, the helix angles may be changed for respective successive layers of material simply by changing the transmission gear ratio between the mandrel 62 and the drive member 98, this being done by means of the gear shift lever 103. In any event, the synchronization between mandrel 62 and carriage 96 is such that said carriage will cause uniform thicknesses of material to be wound along the entire length of said mandrel without any uncovered areas remaining along said mandrel.

In practice, the carriage will wind the material along the mandrel at either a helix angle, as illustrated by the winding in FIGS. 8, 9, and 14, such that the carriage advances only a band width for each revolution of the mandrel, or at a helix angle of about 45°.

In any event, the synchronization between carriage and mandrel is such that at the end of each double stroke (that is: each complete reciprocation of the carriage) the carriage returns to a new starting position along the axial extent of the mandrel, the new starting position being displaced axially away from any preceding starting position. The carriage continues to reciprocate until the entire axial extent of the mandrel has been covered by the helical windings and will result in the creation of two mutually overlying layers of material in all instances in which the helix angle of the winding exceeds the minimum helix angle. In this regard, it should be recalled that the minimum helix angle is that which results in the successive winding turns lying against each other as is illustrated in FIGS. 8, 9 and 14.

The glass rovings on the respective rolls 104 and 105 could each be of different colors or be impregnated beforehand with different colored bonding agents in which instance it would not be necessary to include bonding agent within carriage trough 101. On the other hand, the rovings from rolls 104 and 105 could be wound successively rather than simultaneously onto the mandrel, in which case the arrangement of FIG. 15 could be employed in order to apply differently colored bonding agents to the respective rovings.

Figure 15:
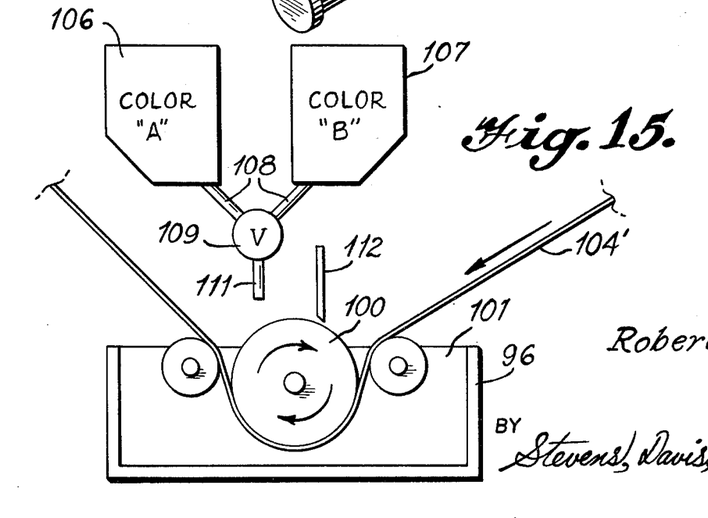
Figure 16:
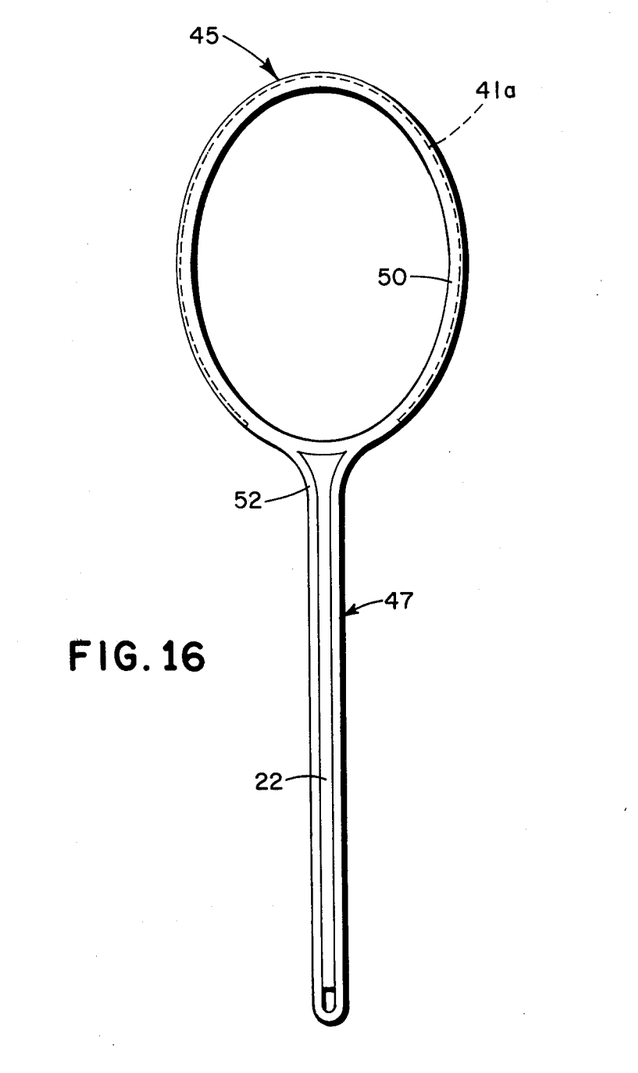
FIG. 16 is a plan view of a racket frame produced by the apparatus of the preceding figures.

As is seen in FIG. 15, the roving 104' is guided to the mandrel by the carriage guide means roller 100, no bonding agent being in trough 101. Positioned above the guide means 100 and movable together with the carriage are two reservoirs 106 and 107 each containing a differently colored bonding agent and each feeding same through lines 108 to a common two-way valve 109 which connects one of the reservoirs at a time through nozzle 111 to the guide means roller 100. A dictor blade 112 is arranged to maintain a bonding agent film of fixed thickness along the roller surface so that the roving receives a uniform quantity of said agent. When one layer of glass roving has been applied and another layer is to be wound onto the mandrel, the valve 109 is turned to feed agent from the other reservoir. A layer of impermeable material such as metal foil could be wound over the first colored glass roving layer to separate same from the subsequently would roving of a different color.

The racket frames formed by the method and apparatus of the present invention have many advantages. For example, they will exhibit tensile strength and compressive strength in excess of 80,000 lbs. per square inch, which is over three times the strength of a typical laminated wooden racket. Also, a greater fatigue life is present in the racket frame of the present invention, since the stress level during use is a smaller percentage of the ultimate strength than that of a wooden frame, resulting in a greater reserve strength in the frame of the present invention. Another advantage of the frame of the present invention is that it can be given a controlled degree of flexibility and stiffness through a selection of several parameters, such as type of material, amount of material, degree of curing, etc. Furthermore, the surface of the fiberglass racket of the present invention is much harder than that of wooden rackets and is, therefore, more scratch and damage resistant. Also, the racket of the present invention maintains its original permanent color, and will not warp because it is inert.

Of course variations of the specific construction and arrangement of this type of apparatus and method herein disclosed may be made by those skilled in the art without departing from the invention as defined in the appended claims.

What is claimed is:

1. A racket frame having a tensile and compressive strength in excess of 80,000 pounds per square inch defining an annular head portion for receiving a stringing, a throat and a neck portion and a solid handle portion extending from said neck portion, said frame being a laminated structure made up of a plurality of layers of material integrally bonded to each other by a hardened bonding agent, at least one of said layers constituting a continuous filamentary windable material which forms a closed loop whose configuration defines solely the inner periphery of said head and throat portions, and other of said layers also constituting a continuous filamentary windable material and a closed loop which in tensioned condition extends about the outer periphery of said loop of said head and away therefrom at said neck to form said handle portion.

2. The frame of claim 1, said windable material layers constituting substantially all of said laminated structure.

3. A racket frame according to claim 1, said layers of windable material constituting the main load bearing portion of said structure, said structure comprising a plurality of layers of a said windable material impregnated with a hardenable bonding agent, including a layer of absorbent material interposed between said layers.

4. A racket frame according to claim 1, said layers of windable material constituting the main load bearing portion of said structure, said structure comprising a plurality of layers of a said windable material impregnated with a hardenable bonding agent, including a layer of metal foil interposed between said layers.

5. A racket frame according to claim 1, said layers of windable material constituting the main load bearing portion of said structure, said structure comprising a plurality of layers of a said windable material impregnated with a hardenable bonding agent, including respective groups of said layers, each group comprising a layer of absorbent material interposed between two layers of said windable material and at least one layer of metal foil interposed between said groups of layers.

6. A racket frame according to claim 1, the density of said windable material and bonding agent being at least 0.065 lbs/in$^3$ of the resultant combination of windable material and hardened bonding agent.

7. The racket frame of claim 1, including a spacer element extending centrally along the length of said handle portion between respective ones of said layers.

8. The racket frame of claim 2, said windable material being a glass fiber material such as fiberglass.

9. The racket frame of claim 2, said bonding agent being a liquid substance cured to a rigid condition.

10. The racket frame of claim 2, including a plurality of said layers of windable material, the filaments of a said layer extending transversely to the filaments of another of said layers so as to provide strength to said structure along the respective transverse directions of the filaments in said material layers.

11. The racket frame of claim 3, the bonding agent of respective ones of said windable material layers being different from each other as to color.

12. The racket frame of claim 9, wherein said agent is a thermosetting resin.

13. The racket frame of claim 1, said windable material having a density of from 0.065 to 0.085 lbs/in$^3$ of said structure.

* * * * *